(12) United States Patent
Alzen

(10) Patent No.: US 11,073,837 B2
(45) Date of Patent: Jul. 27, 2021

(54) ADAPTIVE BOUNDARY WIRE TRANSMITTER

(71) Applicant: Globe (Jiangsu) Co., Ltd., Jiangsu (CN)

(72) Inventor: Jimmy Alzen, Norrahammar (SE)

(73) Assignee: Globe (Jiangsu) Co., Ltd., Jiangsu (CN)

(*) Notice: Subject to any disclaimer, the term of this patent is extended or adjusted under 35 U.S.C. 154(b) by 23 days.

(21) Appl. No.: 16/499,468

(22) PCT Filed: May 28, 2018

(86) PCT No.: PCT/CN2018/088631
§ 371 (c)(1),
(2) Date: Sep. 30, 2019

(87) PCT Pub. No.: WO2019/227269
PCT Pub. Date: Dec. 5, 2019

(65) Prior Publication Data
US 2020/0371529 A1    Nov. 26, 2020

(51) Int. Cl.
*G05D 1/02* (2020.01)
(52) U.S. Cl.
CPC ... *G05D 1/0265* (2013.01); *G05D 2201/0208* (2013.01)
(58) Field of Classification Search
None
See application file for complete search history.

(56) References Cited

U.S. PATENT DOCUMENTS

| 3,498,403 | A | * | 3/1970 | Kohls | G05D 1/0265 180/168 |
| 3,789,939 | A | * | 2/1974 | Geislinger | G05D 1/0272 180/6.5 |
| 5,272,466 | A | | 12/1993 | Venczel | |

(Continued)

FOREIGN PATENT DOCUMENTS

| CN | 102591342 A | 7/2012 |
| CN | 102889850 A | 1/2013 |

(Continued)

OTHER PUBLICATIONS

Search Report and Written Opinion in related International Patent Application No. PCT/US2018/088631 dated Mar. 1, 2019; 9 pages.

(Continued)

*Primary Examiner* — Muhammad Adnan
(74) *Attorney, Agent, or Firm* — Rooney IP, LLC

(57) ABSTRACT

An adaptive boundary wire transmitter includes two bridge coupled power amplifiers, a sensing element, a feedback amplifier, a compensation network and an error amplifier. The adaptive boundary wire transmitter is connected to a boundary wire installation, including a boundary wire and feeds the boundary wire with a boundary signal current. By using a feedback amplifier to which the boundary signal current is fed together with the input signal together with compensation network and an error amplifier it is possible to generate a stable output signal from the adaptive boundary wire transmitter to the boundary wire that is independent of the boundary wire length.

8 Claims, 5 Drawing Sheets

(56) References Cited

U.S. PATENT DOCUMENTS

| | | | | |
|---|---|---|---|---|
| 5,642,690 | A * | 7/1997 | Calabrese | G05D 1/0221 |
| | | | | 119/721 |
| 5,870,973 | A * | 2/1999 | Touchton | A01K 15/023 |
| | | | | 119/721 |
| 6,300,737 | B1 * | 10/2001 | Bergvall | A01D 34/008 |
| | | | | 180/167 |
| 6,465,982 | B1 * | 10/2002 | Bergvall | A47L 9/2805 |
| | | | | 318/587 |
| 7,081,821 | B2 * | 7/2006 | So | A01K 15/023 |
| | | | | 119/720 |
| 7,126,475 | B2 * | 10/2006 | So | A01K 15/023 |
| | | | | 340/564 |
| 8,954,193 | B2 * | 2/2015 | Sandin | B60L 50/66 |
| | | | | 700/258 |
| 9,740,210 | B2 * | 8/2017 | Sjoholm | G05D 1/0265 |
| 9,901,028 | B2 | 2/2018 | Hans | |
| 10,609,862 | B2 * | 4/2020 | Wu | G06K 9/527 |
| 2002/0196151 | A1 * | 12/2002 | Troxler | G01C 21/005 |
| | | | | 340/573.4 |
| 2005/0139169 | A1 * | 6/2005 | So | A01K 15/023 |
| | | | | 119/721 |
| 2006/0061469 | A1 * | 3/2006 | Jaeger | B60R 25/00 |
| | | | | 340/539.13 |
| 2006/0112901 | A1 | 6/2006 | Gomez | |
| 2008/0097645 | A1 * | 4/2008 | Abramson | A01D 34/008 |
| | | | | 700/258 |
| 2008/0168949 | A1 * | 7/2008 | Belcher | A01K 15/023 |
| | | | | 119/721 |
| 2011/0202307 | A1 * | 8/2011 | Petereit | A01D 34/008 |
| | | | | 702/150 |
| 2011/0234153 | A1 * | 9/2011 | Abramson | B60L 53/305 |
| | | | | 320/107 |
| 2013/0092099 | A1 * | 4/2013 | Hardi | A01K 29/005 |
| | | | | 119/721 |
| 2013/0154688 | A1 * | 6/2013 | Petereit | H03K 5/22 |
| | | | | 327/72 |
| 2014/0130751 | A1 * | 5/2014 | Meikle | A01K 15/023 |
| | | | | 119/721 |
| 2014/0324269 | A1 * | 10/2014 | Abramson | G05D 1/0212 |
| | | | | 701/26 |
| 2016/0014955 | A1 * | 1/2016 | Hans | A01D 34/008 |
| | | | | 700/253 |
| 2016/0014995 | A1 | 1/2016 | Bruno | |
| 2016/0334800 | A1 * | 11/2016 | Han | G05D 1/0274 |
| 2017/0322562 | A1 * | 11/2017 | Churavy | H03M 13/156 |
| 2018/0017981 | A1 * | 1/2018 | McFarland | G01R 19/02 |
| 2019/0148933 | A1 * | 5/2019 | Olszyk | G08B 21/18 |
| | | | | 340/635 |
| 2019/0369620 | A1 * | 12/2019 | Zhou | G05D 1/0212 |
| 2020/0093057 | A1 * | 3/2020 | Liljedahl | A01D 34/008 |

FOREIGN PATENT DOCUMENTS

| | | |
|---|---|---|
| CN | 104521417 A | 4/2015 |
| EP | 1025472 A1 | 8/2000 |

OTHER PUBLICATIONS

European Search Report and Opinion in related European Patent Application No. 18914941.2 (EP3602227) dated Apr. 3, 2020; 5 pages.

PCT Search Report and Written Opinion in related International Patent Application No. PCT/CN2018/088631 dated Mar. 1, 2019; 9 pages.

* cited by examiner

ADAPTIVE BOUNDARY WIRE TRANSMITTER

TECHNICAL FIELD

The present invention relates generally to a transmitter for powering a boundary wire installation used for keeping a robotic lawnmower within an area surrounded by a boundary wire, and more specifically a transmitter that is adaptive to properties of the boundary wire installation.

BACKGROUND ART

In prior art, robotic lawnmowers are generally known. For example, EP 1 025 472 discloses a battery-operated lawnmower having a control unit for determining the travel direction and speed of the lawnmower. The surface to be mowed is defined by a border delimitation wire. Two signals with alternating voltage are applied simultaneously by a signal generator to the border delimitation wire. These signals are detected by receiving coils in the lawnmower and evaluated in order to decide if the lawnmower is located within or outside the border delimitation wire. The quality of these signals is important in order to make a correct decision regarding the position of the lawnmower. In order to enhance the quality of these signals one usually performs a calibration where the applied alternating voltage is adapted to the properties of the border delimitation wire during installation of the system. Such properties may be length and configuration of the border delimitation wire. This calibration process may be time-consuming.

US2016/0014955 discloses a method for operating a self-propelled lawnmower, which is moved within a surface that is surrounded by a border delimitation wire. Electrical signals are transmitted in the border delimitation wire and create an electromagnetic field that is sensed and evaluated by the lawnmower in order to determine if the lawnmower is inside or outside the surface encircled by the border delimitation wire. In order to improve the electromagnetic resistance against interference the electrical signals that are transmitted in the border delimitation wire are transmitted with a predetermined pattern. This predetermined pattern, as received by the lawnmower, is compared with a predetermined reference pattern by evaluating the received signal by means of correlation (convolution method). The result of the comparison is used to determine if the lawnmower is inside or outside the border delimitation wire and to control the lawnmower accordingly. Also, here the quality of transmitted signals to the border delimitation wire is important and is highly affected by the properties of the boundary wire, such as length. The signal may be calibrated when the system is installed, which is, as mentioned above, time-consuming.

One way to solve this time-consuming calibration problem is to have factory settings for fixed length border delimitation wires. However, this is not very flexible, since the length of the border delimitation needs to be adapted to each specific installation. Thus, there is a need for a system or a transmitter which is adaptable to different lengths of boundary wires, without any time-consuming calibration and which output signals that are readily recognizable by the robotic lawnmower.

SUMMARY OF INVENTION

An object of the present invention is to provide an adaptive boundary wire transmitter which adapts the output signal to the properties, such as length, of boundary wire installation.

According to one aspect of the present invention this object is achieved by an adaptive boundary wire transmitter comprising two bridge coupled power amplifiers, a sensing element, a feedback amplifier, a compensation network and an error amplifier. The adaptive boundary wire transmitter is connected to a boundary wire installation, comprising a boundary wire, for feeding the boundary wire with a boundary signal current. The adaptive boundary wire transmitter is arranged to feed a positive input of the feedback amplifier with an input voltage signal, sense, by means of the sensing element, the boundary signal current, error amplify the sensed boundary signal current by means of the error amplifier, feed the error amplified boundary signal current to the negative input of the feedback amplifier, amplify, by means of the two bridge coupled amplifiers, an output signal from the feedback amplifier, limit the output frequency response of the amplified output signal from the feedback amplifier by means of the compensation network and feed the amplified output signal from the feedback amplifier to the boundary wire.

In an exemplary embodiment the compensation network comprises a resistor connected in parallel with another resistor and a capacitor. In another embodiment the two bridge coupled amplifiers comprises one positive power amplifier and one negative power amplifier.

In another embodiment the boundary wire installation further comprises a guide wire and a third negative power amplifier is arranged in the adaptive boundary wire transmitter to feed an amplified output signal from the feedback amplifier to the guide wire. The adaptive boundary wire transmitter may further comprise two switches arranged to selectively drive either the boundary wire or the guide wire by means of each negative power amplifier, respectively. In one exemplary embodiment the switches are triodes for alternating current. In yet another embodiment also, the positive power amplifier is provided with a switch, preferably a triode for alternating current.

In another exemplary embodiment the boundary wire installation may be provided with a discharge tube. Preferably there is provided a discharge tube for each power amplifier.

By providing an adaptive boundary wire transmitter comprising two bridge coupled power amplifiers, a sensing element, a feedback amplifier, a compensation network and an error amplifier a transmitter circuit is created that controls and adapts the output signal to the boundary wire installation automatically to different lengths of the boundary wires and guide wires without the need for time-consuming calibration and with high quality output signals.

BRIEF DESCRIPTION OF DRAWINGS

The invention is now described, by way of example, with reference to the accompanying drawings, in which.

DESCRIPTION OF EMBODIMENTS

In the following, a detailed description of exemplary embodiments of an adaptive boundary wire transmitter according to the present invention for will be presented.

Figure 1:
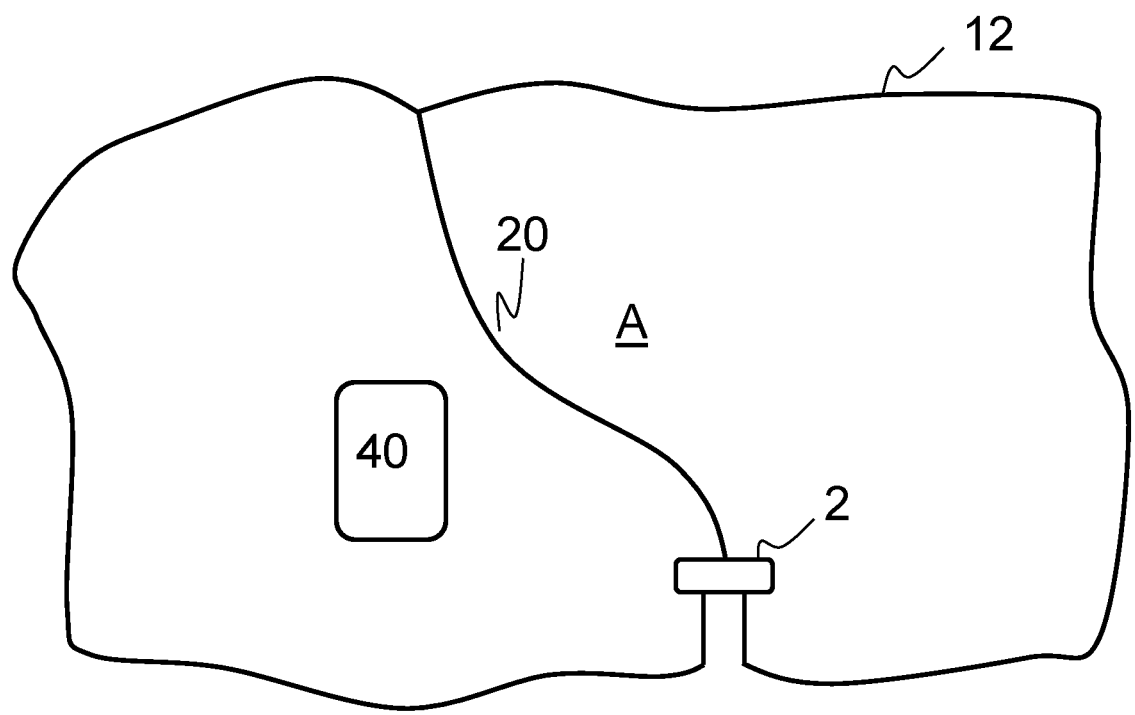
FIG. 1 a schematic view of a boundary wire installation.

First a general description of a robotic lawnmower system will be made. FIG. 1 shows a robotic lawnmower 40 which is arranged move across an area A surrounded by a boundary wire 12. As is obvious the lawnmower 40 is depicted somewhat enlarged for the sake of clarity. The boundary wire 12 may be configured in any way, such that it delimits the area A within which the robotic lawnmower 40 is allowed to move. The boundary wire 12 is preferably provided under the ground in the lawn, such that is not visible, but may also be provide on or above the ground. The boundary wire 12 could be an ordinary copper wire of single-core type. There are of course also other options, which is well-known by a person skilled in the art, such as multi stranded wire types. The system also comprises a signal generator which feeds a transmitter 2 that supplies the boundary wire 12 with an Alternating Current, AC, signal to be closer described below. FIG. 1 also discloses a guide wire 20, which the transmitter 2 also may supply with an AC signal. The purpose of the guide wire 20 is to guide the robotic lawnmower 40 back to a charging position when a battery of the robotic lawnmower 40 needs to be recharged. Using the guide wire 40 instead of the boundary wire 12 as a return path may shorten the distance and time it takes for the robotic lawnmower 40 return to its charging position.

Figure 2:
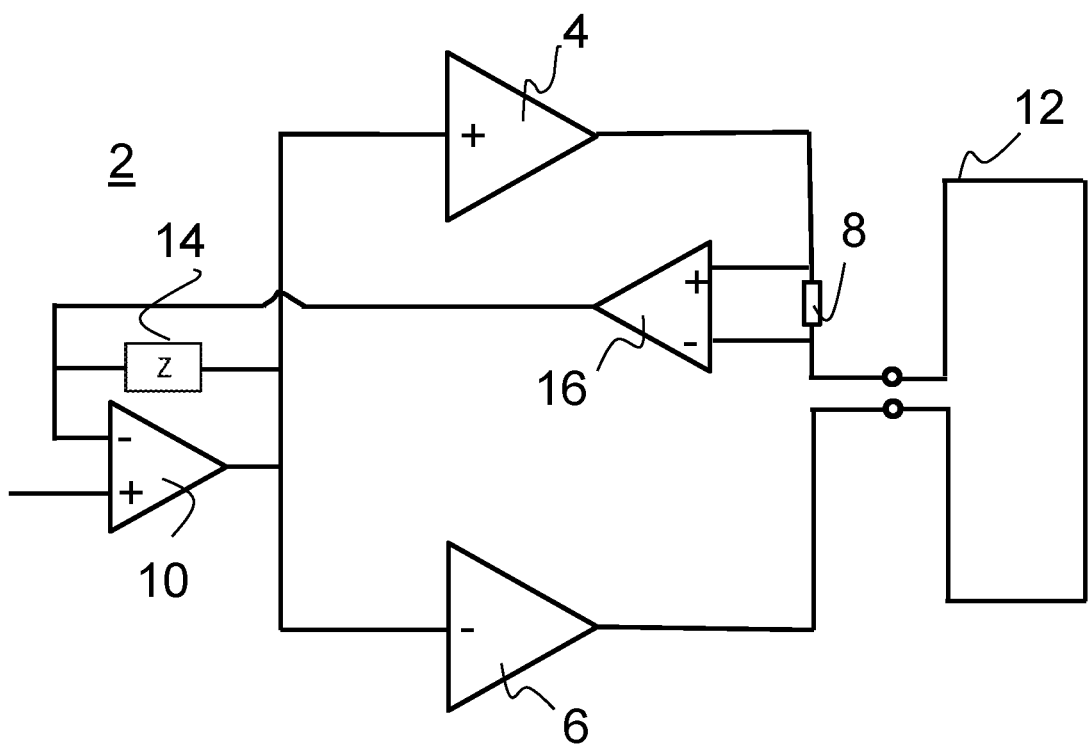
FIG. 2 is a schematic view of an adaptive boundary wire transmitter.

Turning now to FIG. 2, the transmitter 2 will be closer described. The boundary wire transmitter comprises two bridge coupled power amplifiers 4, 6, a sensing element 8, a feedback amplifier 10, a compensation network 14 and an error amplifier 16. As mentioned above, boundary wire transmitter 2 is connected to a boundary wire installation, comprising the boundary wire 12 and optional also a guide wire 20.

The positive input of the feedback amplifier 10 is connected to a signal generator, which feeds the feedback amplifier 10 with an input voltage signal. The negative input of the feedback amplifier 10 is fed with a boundary signal current, which is sensed by means of the sensing element 8 and error amplified by the error amplifier 16 before it is fed to the feedback amplifier 10.

Figure 3:
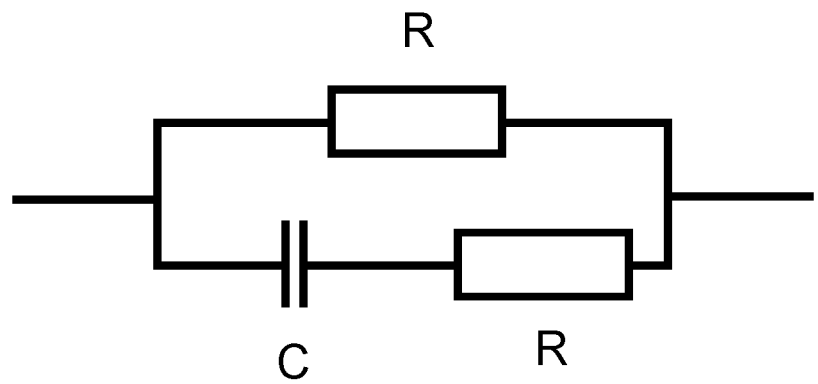
FIG. 3 is a schematic block diagram of an exemplary compensation network.

The output signal from the feedback amplifier 10 is amplified, by means of the two bridge coupled amplifiers 4, 6 and fed to the boundary wire 12. In order to limit the output frequency response of the amplified output signal from the feedback amplifier 10 the compensation network 14 is provided between the output of the feedback amplifier 10 and negative input of the feedback amplifier 10. In an exemplary embodiment, shown in FIG. 3, the compensation network 14 comprises a resistor R connected in parallel with another resistor R and a capacitor C. As understood by a person skilled in the art there are also other possible ways to design a compensation network 14 that limits the output frequency response.

The two bridge coupled amplifiers comprise one positive power amplifier 4 and one negative power amplifier 6. Which one of the two bridge coupled amplifier 4, 6 is negative and positive is not important in order to achieve the result, but that they are different. Thus, in one embodiment the power amplifier 4 is the negative and power amplifier 6 is the positive. In such a case the polarity of the feedback amplifier 10 also needs to change. Having a boundary wire transmitter 2 with a configuration as shown in FIG. 2 makes it possible to accomplish a boundary transmitter that is adaptive to the length of the boundary wire 12 and/or the guide wire 20. Thus, this solution makes the installation of the robotic lawnmower system very efficient, since there is no need for calibrating the system, since the transmitter is an adaptive boundary wire transmitter 2.

Figure 4A:
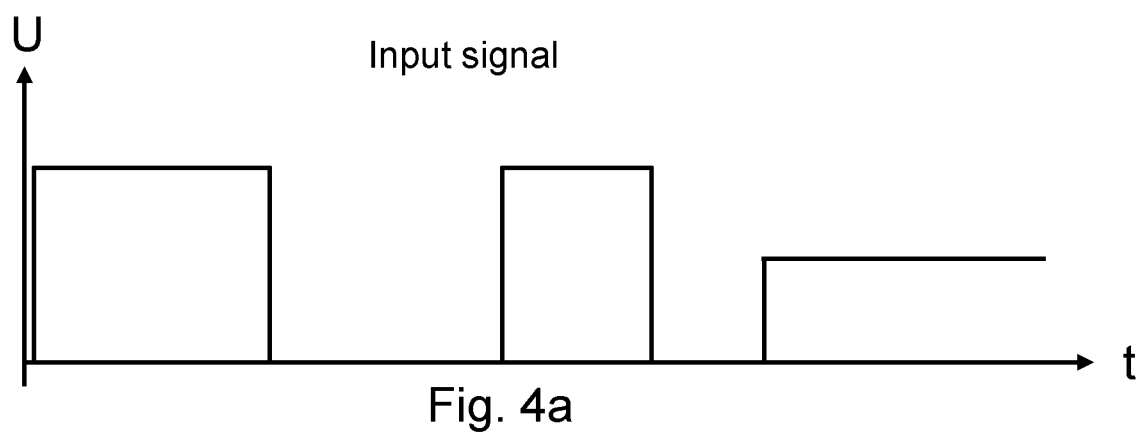
FIGS. 4a to 4e are signal diagrams is a schematic block diagram of a signal generator.
Figure 4B:
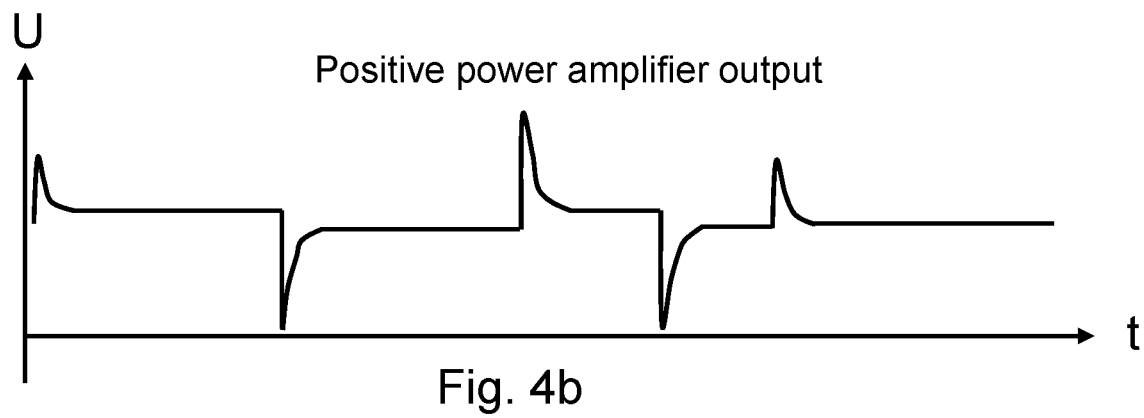
Figure 4C:
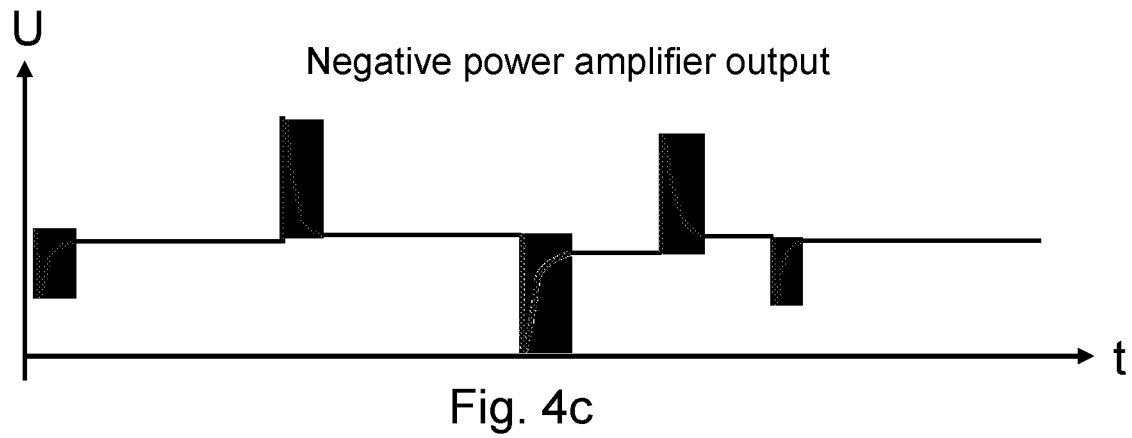
Figure 4D:
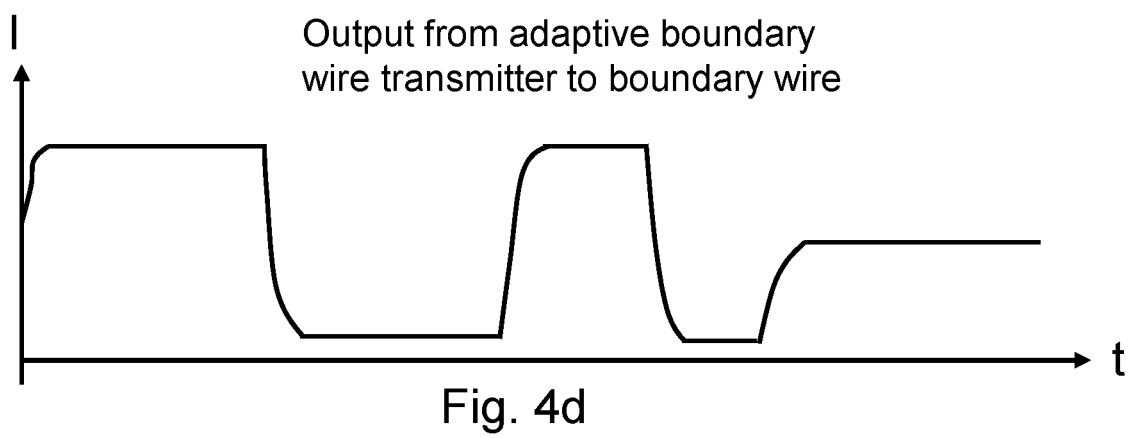
Figure 4E:
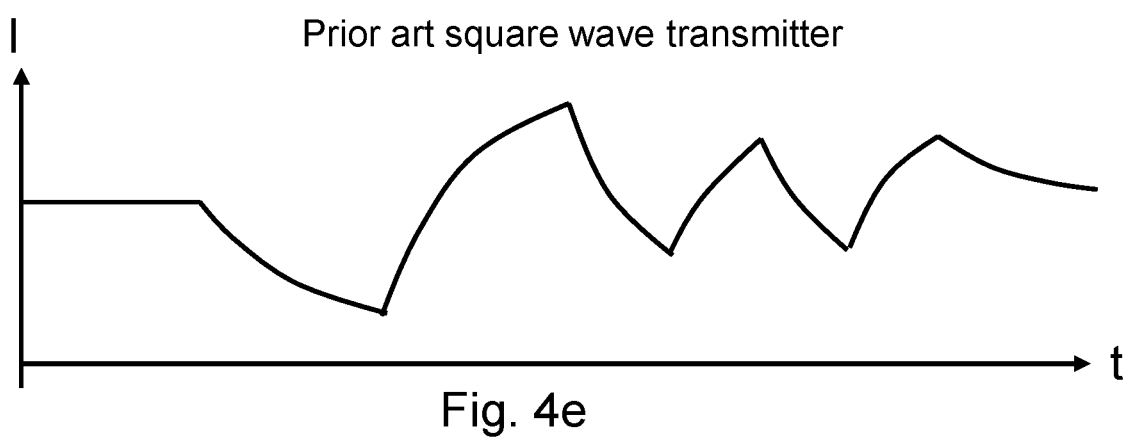

Turning now to FIG. 4a-FIG. 4e the benefits of the adaptive boundary transmitter 2 will become readily apparent. FIG. 4a shows the input signal to the positive input of the feedback amplifier 10, having a square wave like shape. This input signal to the adaptive boundary wire transmitter 2 will turn up as an output signal on the positive power amplifier 4 as shown in FIG. 4b and as an output signal on the negative power amplifier 6 as shown FIG. 4c. These two output signals will together form the output signal from the adaptive boundary wire transmitter 2 to the boundary wire 12, as is shown in FIG. 4d. As can be seen in FIG. 4d the output signal from the adaptive boundary system is of high quality and does not deviate so much from the signal that was inputted to the positive input of the feedback amplifier 10. If this outputted signal to the boundary wire 12 is compared to the output signal on the boundary wire in a prior art installation, as shown in FIG. 4e. the deterioration of the output signal can be clearly seen. Thus, using the adaptive boundary wire transmitter 2 according to the present invention is very advantageous when creating a stable and recognizable signal on a boundary wire 12.

Figure 5:
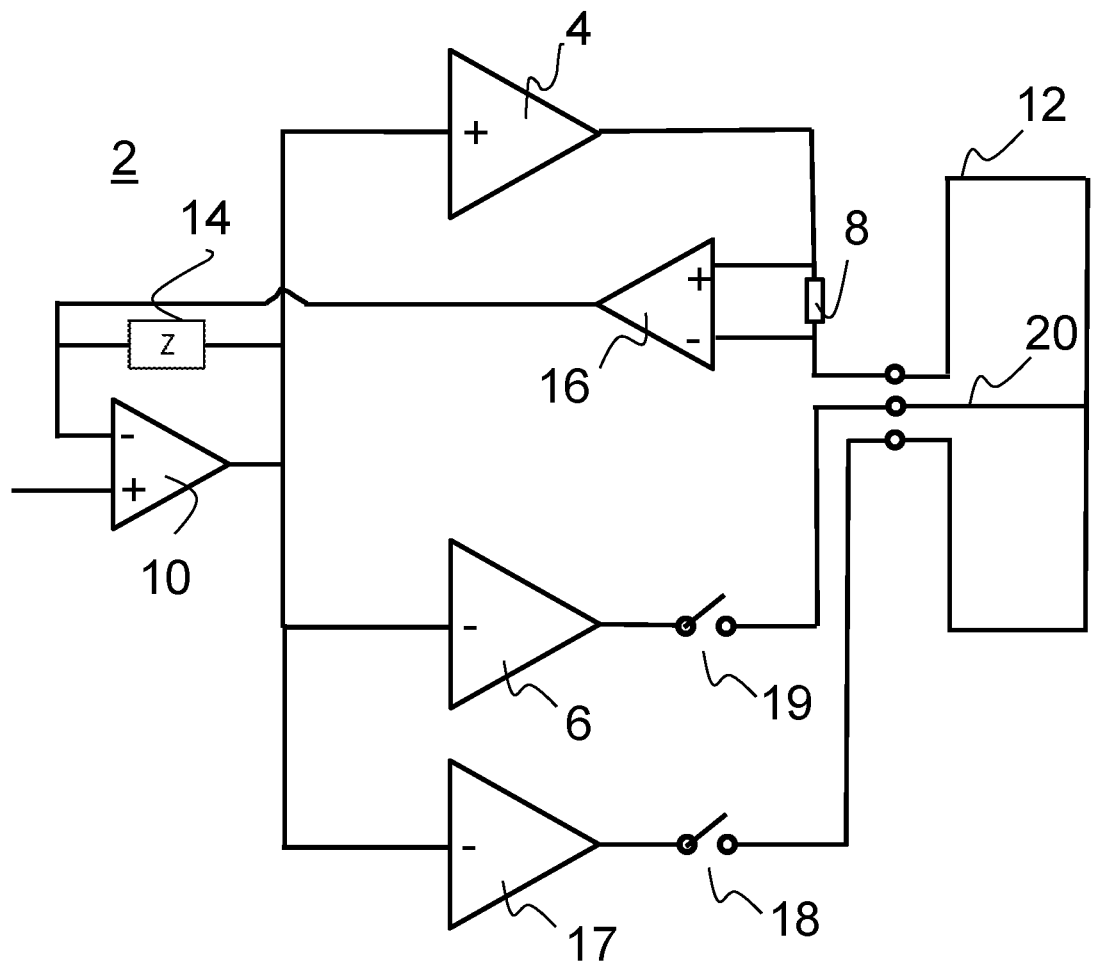
FIG. 5 is a schematic block diagram of another exemplary adaptive boundary wire transmitter.

Turning now to FIG. 5, another embodiment of the adaptive boundary wire transmitter 2 will be described. This embodiment is suitable for boundary wire installations comprising a guide wire 20 and a third negative power amplifier 17 is arranged to feed an amplified output signal from the feedback amplifier 10 to the guide wire 20. Furthermore, FIG. 5 shows that the adaptive boundary wire transmitter 2 comprises two switches 18, 19 arranged to selectively drive either the boundary wire 12 or the guide wire 20 by means of each negative power amplifier 6, 17, respectively. The switches 18, 19 may be transistors that are switched on one at a time in order to either drive the boundary wire 12 or the guide wire 20. Alternatively, the switches 18, 19 may also be triodes for alternating current, TRIACs.

Figure 6:
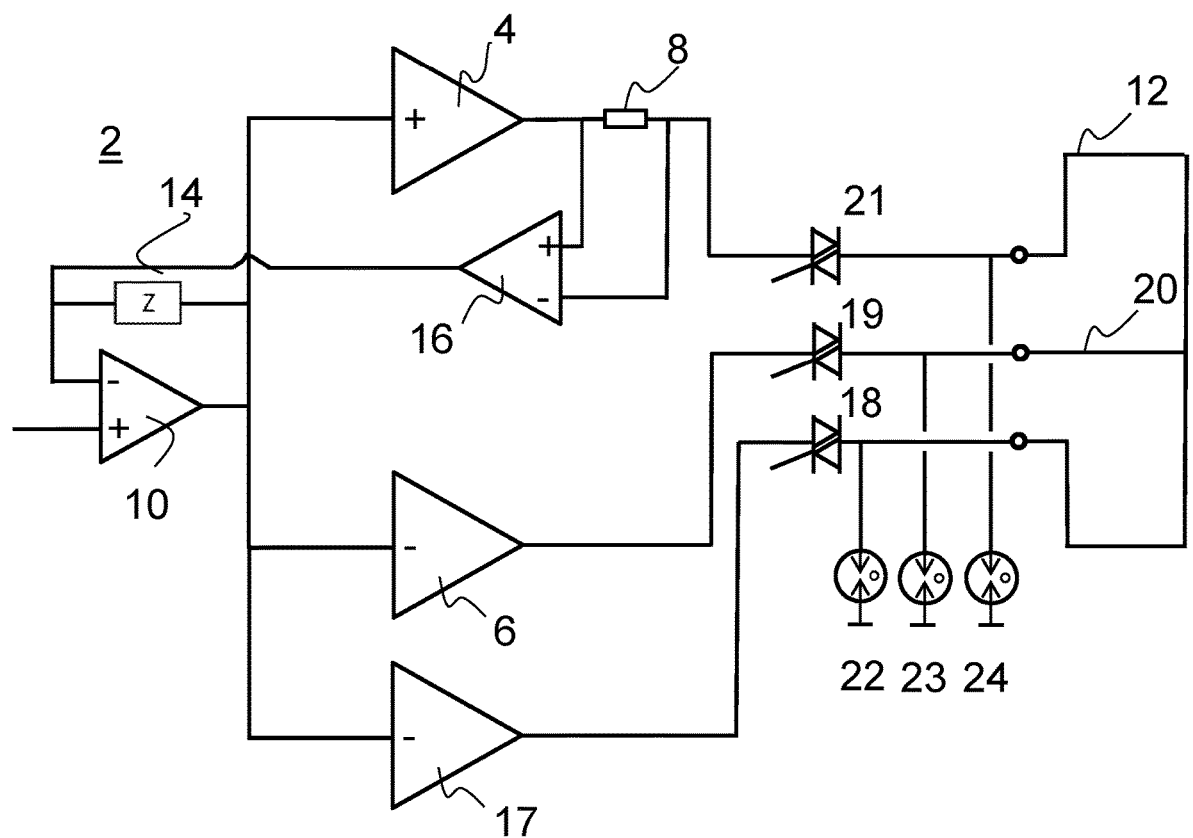
FIG. 6 is a schematic block diagram block diagram of yet another exemplary adaptive boundary wire transmitter.

Turning now to FIG. 6 yet another embodiment of the boundary wire transmitter 2 will be described. The boundary wire transmitter 2 according to FIG. 6 further comprises an additional TRIAC 21 provided at the output of the positive power amplifier 4. The advantage of using TRIACs is that they resist high voltages on power amplifier 4, 6, 17 outputs. This will make the adaptive boundary wire transmitter 2 much more resistant against lightning strikes. Preferably, the adaptive boundary wire transmitter 2 also comprises discharge tubes 22, 23, 24 arranged at the output of the power amplifiers to further increase the resistance against lightning strikes.

Although, the present invention has been described above with reference to specific embodiments, it is not intended to be limited to the specific form set forth herein. Rather, the invention is limited only by the accompanying claims. For example, as mentioned above, polarity of the amplifiers may be reversed with each other without departing from the scope.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An adaptive boundary wire transmitter comprising a feedback amplifier, a compensation network, an error amplifier, and two bridge coupled power amplifiers comprising one positive power amplifier, one negative power amplifier, a sensing element and a boundary wire, wherein the adaptive boundary wire transmitter is connected to a boundary wire installation, comprising the boundary wire, for feeding the boundary wire with a boundary signal current and the compensation network is connected between an output of the feedback amplifier and a negative input of the feedback amplifier, thereby adapting the boundary wire installation automatically to different boundary wire lengths, and wherein the adaptive boundary wire transmitter is arranged to:
feed a positive input of the feedback amplifier with an input voltage signal,
sense, by means of the sensing element, the boundary signal current,
error amplify the sensed boundary signal current by means of the error amplifier,
feed the error amplified boundary signal current to the negative input of the feedback amplifier,
amplify, by means of the two bridge coupled amplifiers, an output signal from the feedback amplifier,
limit the output frequency response of the amplified output signal from the feedback amplifier by means of the compensation network, and
feed the amplified output signal from the feedback amplifier to the boundary wire.

2. The adaptive boundary wire transmitter according to claim 1, wherein the compensation network comprises a resistor connected in parallel with another resistor and a capacitor.

3. The adaptive boundary wire transmitter according to claim 1, wherein the positive power amplifier is provided with a switch for alternating current.

4. The adaptive boundary wire transmitter according to claim 1, wherein the boundary wire installation further comprises a guide wire and wherein a third negative power amplifier is arranged to feed an amplified output signal from the feedback amplifier to the guide wire.

5. The adaptive boundary wire transmitter according to claim 4, further comprising two switches arranged to selectively drive either the boundary wire or the guide wire by means of each negative power amplifier, respectively.

6. The adaptive boundary wire transmitter according to claim 5, wherein the switches are TRIACs for alternating current.

7. The adaptive boundary wire transmitter according to claim 4, wherein the boundary wire installation is provided with a discharge tube.

8. The adaptive boundary wire transmitter according to claim 7, wherein a discharge tube is provided for each power amplifier.

* * * * *